(12) United States Patent
Patel (10) Patent No.: US 8,242,464 B1
(45) Date of Patent: Aug. 14, 2012

(54) DEVICE AND A PROCESS FOR MASS MONITORING OF RADIATION EXPOSURE

(76) Inventor: Gordhanbhai N. Patel, Middlesex, NJ (US)

( * ) Notice: Subject to any disclaimer, the term of this patent is extended or adjusted under 35 U.S.C. 154(b) by 0 days.

(21) Appl. No.: 12/248,248

(22) Filed: Oct. 9, 2008

Related U.S. Application Data (60) Provisional application No. 60/998,638, filed on Oct. 12, 2007.

(51) Int. Cl.
 *G01T 1/02* (2006.01)
(52) U.S. Cl. ............... 250/472.1; 250/473.1; 250/474.1
(58) Field of Classification Search .............. 250/474.1, 250/473.1, 472.1, 337
See application file for complete search history.

(56) References Cited

U.S. PATENT DOCUMENTS

| | | | | |
|---|---|---|---|---|
| 4,420,000 A | 12/1983 | Bailey | ......................... | 128/706 |
| 5,030,834 A | 7/1991 | Lindmayer et al. | ........ | 250/484.1 |
| 5,091,653 A | 2/1992 | Creager et al. | ............. | 250/484.1 |
| 5,567,948 A | 10/1996 | Miller | ........................ | 250/484.5 |
| 5,569,927 A | 10/1996 | Miller | ........................ | 250/484.5 |
| 5,656,815 A | 8/1997 | Justus et al. | ................... | 250/337 |
| 5,732,590 A | 3/1998 | Heitze et al. | ..................... | 72/455 |
| 5,811,822 A | 9/1998 | Huston et al. | ............. | 250/484.4 |
| 5,892,234 A | 4/1999 | McKeever et al. | ......... | 250/459.1 |
| 5,962,857 A | 10/1999 | McKeever et al. | ......... | 250/484.5 |
| 6,087,666 A | 7/2000 | Huston et al. | ............. | 250/484.5 |
| 6,316,782 B1 | 11/2001 | Akselrod et al. | ............. | 250/582 |
| 6,414,324 B1 | 7/2002 | Colyott et al. | ............. | 250/484.5 |
| 7,227,158 B1 | 6/2007 | Patel et al. | ................. | 250/484.5 |
| 7,420,187 B1 * | 9/2008 | Klemic et al. | ............. | 250/484.5 |

FOREIGN PATENT DOCUMENTS

| | | | |
|---|---|---|---|
| JP | 53063080 A | * | 6/1978 |
| JP | 55155270 A | * | 12/1980 |
| WO | 2004/017095 | | 2/2004 |
| WO | 2004/077097 | | 9/2004 |

\* cited by examiner

*Primary Examiner* — Constantine Hannaher
(74) *Attorney, Agent, or Firm* — Joseph T. Guy; Nexsen Pruet, LLC (57) ABSTRACT

A radiation detection device with at least one self indicating radiation sensor and at least one machine readable sensor.

31 Claims, 6 Drawing Sheets

DEVICE AND A PROCESS FOR MASS MONITORING OF RADIATION EXPOSURE

CROSS-REFERENCE TO RELATED APPLICATIONS

This application claims priority to Provisional Patent Appl. No. 60/998,638 filed Oct. 12, 2007.

FIELD OF THE INVENTION

This invention relates to a device, preferably in the form of a identification device (ID), containing a radiation sensor for monitoring radiation exposure of the general public and processes of reading dose and determining dose distribution of the area in the event of radiological incident.

BACKGROUND OF THE INVENTION

Radiation is known to cause cancer. On average, we receive about 0.3 rads/year of high energy radiation. Rad (radiation absorbed dose, 1 rad=10 mSv) is one of the units of radiation exposure. According to the US Nuclear Regulatory Commission (NRC) guidelines, the maximum permitted dose for an occupational radiation worker is 5 rads/year, not to exceed 25 rads for the life. There is no easily detectable clinical effect in humans up to 25 rads. However, on average, if 2,500 people are exposed to one rad of radiation, one is expected to die of radiation induced cancer. Hence, we need to minimize the exposure and should monitor radiation exposure from very low dose, e.g., 10 millirads to lethal dose, e.g., a few thousand rads.

A large number of radiation detectors, monitors, and dosimeters are used for detecting and monitoring radiation. The most popular detectors include ionization chambers, proportional counters, Geiger-Mueller counters, scintillation detectors, semiconductor diode detectors (also referred herein as electronic sensor or electronic detector), and dosimeters such as Thermoluminescence Dosimeters (TLD), Optically Simulated Luminescence (OSL), RadioLuminescence Glass (RLG), X-ray film, and track etch. Track-etch type dosimeters are usually used for monitoring high Linear Energy Transfer (LET) particles, such as alpha particles and neutrons. Many other radiation dosimeters comprising a material which changes color or which change in other physical and chemical properties are reported in literature. Individually, or collectively, these devices for monitoring radiation are referred to as dosimeter(s).

X-ray film, TLD, RLG, and OSL are widely used for monitoring personal exposure to radiation. They are highly sensitive (e.g., monitor very low dose, e.g., 1 millirad) and can monitor radiation over a very wide dose range, e.g., from 1 millirad to over 10,000 rads. They are also very accurate (e.g., accuracy of about 5%). Companies offering services to monitor radiation using these dosimeters/sensors normally require their facilities, sensors, dosimeters and processes for monitoring radiation validated by a an organization, often a government agency (such as NAVLAP (National Voluntary Laboratory Accreditation) in the USA, a non-profit or an independent organization. X-ray film, TLD, RLG, OSL and alike sensors and dosimeters are referred herein as accredited or validated sensors and/or accredited dosimeters and the methods used as for determination of the dose as accredited or validated methods or processes. However, they are not instant and self-reading. They need to be sent to a laboratory for determination of the dose, which may take several days.

A number of patents have been issued on film, TLD, RLG, and OSL type radiation dosimeters.

Luminescence techniques in radiation dosimetry have traditionally been dominated by thermal methods in which a sample, such as a ThermoLuminescence Dosimeter or TLD, is exposed to radiation and then heated in the dark. At a certain temperature, or within a certain temperature range, luminescence (light) is emitted from the material. The intensity is related, by calibration procedures, to the original absorbed dose of radiation.

However, in many circumstances, optically stimulated luminescence (OSL) has proven to be a superior method of measuring radiation dose. Generally speaking, OSL methods illuminate a previously irradiated dosimeter with light of a particular frequency and intensity. This exposure excites light production within the dosimeter by transfer of charges from traps to luminescence centers. Then, by measuring the intensity and duration of the resulting luminescence signal that is emitted from the dosimeter, an accurate measure of the amount of radiation to which the dosimeter was exposed can be obtained. Methods and dosimeters employing optically stimulated luminescence in the detection of radiation exposures in various configurations are described in U.S. Pat. Nos. 5,030,834; 5,091,653; 5,567,948; 5,569,927; 5,732,590; 5,811,822; 5,892,234; 5,962,857; 6,087,666, 6,316,782; and 6,414,324.

Previously, glass has been considered as potential TLD and OSL phosphors since it was recognized that the optical transparency of it offers the advantage of more efficient light collection. For example, U.S. Pat. No. 5,656,815 to Huston et al. reports the use of glass as a dosimeter. U.S. Pat. No. 5,811,822 to Huston et al. describes novel glass phosphor materials that exhibit highly favorable characteristics for OSL dosimetry applications. Radiophotoluminescent glass (RLG) dosimetry uses a silver activated meta-phosphate glass sheet. Irradiated plates are imaged with a CCD camera as a UV light depopulates the photostimulable phosphor traps emitting visible light. Other dosimeters include: alanine/Electron Proton Resonance (EPR) dosimetry, Nuclear Magnetic Resonance (NMR) technique for measurement of dose in case of ferrous iron dosimeter and a change in conductivity.

Color changing/developing Self-indicating Instant Radiation Alert Dosimeters (SIRAD) for monitoring low dose, e.g., 0.1 to 1,000 rads, have been reported in U.S. Pat. Nos. 5,420,000, 7,727,158 and PCT applications WO2004017095 and PCT/US2004005860 each of which is incorporated by reference. These documents describe detectors which are commercially available from JP Laboratories Inc., Middlesex, N.J. under trademark of SIRAD®.

Materials used in the sensing strip of SIRAD are a unique class of compounds called diacetylenes with a general formula $R'—C≡C—C≡C—R''$, wherein $R'$ and $R''$ are substituent groups. Diacetylenes are colorless solid monomers. They usually form red or blue-colored polymers/plastics with a general formula $[=(R')C—C=C—C(R'')=]_n$, when irradiated with high energy radiation, such as X-ray, gamma ray, electrons, and neutrons. As exposure to radiation increases, the color of the sensing strip comprising diacetylenes intensifies proportional to the dose.

U.S. Pat. No. 7,727,158 to Patel at el discloses a SIRAD sensor in the form of a label or sticker which is applied on a detector or dosimeter. A drawback of this device is that it is not tamper resistant; the SIRAD sticker can be peeled off. The conventional or accredited TLD, OSL, RLG, and X-ray film dosimeters are specially designed for occupational radiation workers and hence are expensive and need to be returned, whether a SIRAD sticker/label is applied or not. Credit card sized TLD dosimeters, commonly known as wallet cards or dosimeters, are less expensive which can be used by non-occupation workers. The chips are typically loose in plastic cards, the cards are very thick and not carried by everybody routinely like a credit card. Additionally, the TLD chips are typically not encapsulated and sealed in the wallet cards. An improved composite, one piece, less expensive, tamper resistant, multi sensor dosimeter, at least one of the sensors being a color developing, such as SIRAD to warn the user of exposure to high dose, usually non-occupational workers, of radiation exposure and the other sensor being the conventional sensor, including electronic devices such as semiconductors, TLD, OSL, RLG, or X-ray film is described by Patel in U.S. patent application Ser. No. 12/294,148 entitled "A Self Indicating Multi-sensor Radiation Dosimeter". These devices are bulky and not suitable for individual use. This type of dosimeter(s) having more than one sensor are described herein as multi-sensor dosimeter(s), multi-sensor device, SIRAD multi-sensor(s), or SIRAD-multi-sensor dosimeter(s). Self-indicating, color changing or color developing dosimeters and sensors are referred herein to as self-indicating radiation sensor, SIRAD sensor(s) or SIRAD dosimeter(s) or simply SIRAD. The TLD, OSL, RLG, X-ray, track-etch, electronic type dosimeters or sensors, including doped glass/ceramic and polymeric are individually or collectively referred to as accurate, precision, readable, accredited or simply as the other, second or conventional dosimeter(s) or sensor(s).

Most of the users, including the radiation occupational workers, of radiation dosimeters receive no more than the background dose or a dose which is negligibly higher than the background dose. However, they do not see or determine their exposure. They return the dosimeter to a service provider for determination of the exposure on some predetermined schedule regardless of possible radiation exposures between test dates. Critical time is lost between the actual exposure and the detection therefore the ability to mitigate the exposure is severely hindered. Furthermore, every badge would need to be read which leads to inherent waste and excessive cost. Hence, there is a need for a disposal dosimeter which can determine when, and if, the user should return the dosimeter earlier for accurate reading by validated or accredited methods.

In the case of a detonation of a dirty bomb by terrorists, a nuclear bomb, or a major accident at a nuclear power plant, first responders, medical personnel, and the general public need to know, "Did I receive an acceptable low or a lethal dose of ionizing radiation?" Hence there is need to know the dose instantly and with high accuracy. In the event of a radiological incident, affected people would panic and be worried throughout their lives about the exposure to radiation. The panic and stampede can cause injuries and deaths. It is very difficult to measure low dose in humans. One can estimate dose by analyzing blood if the dose is higher than about 25 rads. There is also a possibility of lawsuits. In order to minimize the panic and worry, there is a strong need to provide a dosimeter in a form which most of us carry almost all the time. However, this is not practical with the typical conventional dosimeters.

In an event of a radiological incident, the dosimeters preferably are to be read at a very high speed e.g., from a hundred to thousands a minute. Hence, there is also a need for a machine readable dosimeter which can be read at a very high speed. Disclosed herein is an Identification Personal Dosimeter (IDPD) which identifies to an individual, his/her approximate exposure to radiation immediately and which has a sensor which can be accurately read by a machine at a very high speed if warranted.

SUMMARY OF THE INVENTION

If everybody has an IDPD, it is possible to measure the radiation exposure of most of the people in an event of a radiological incident. If an IDPD has a visual sensor such as that of SIRAD, it will provide its user with a preliminary indication of radiation exposure just by looking at the SIRAD sensor and if there is no color development at the end of the shelf life or use period, the dosimeter can be disposed off and the expenses of reading the accurate dose by accredited methods can be eliminated. Since the driver's licenses, credit cards, and employee ID cards are replaced with new ones every year or few years the incorporation of a radiation detector into a commodity greatly expedites its use and insures that an early detection of radiation is in place.

It is an objective of the present invention is to provide an IDPD which is simple, inexpensive, disposable, practically non-destructible, lightweight, tamper resistant, machine readable and wherein exposure is readily evident.

It is another object of the present invention to provide an IDPD which does not require external power, such as a battery, integrates the dose from 0.01 to 10,000 rads for about one year at a high speed, preferably has information identifying the individual carrying the device and further has a machine readable detector.

It is another objective of the invention to incorporate a radiation sensor in a widely used format such as license, identification card or access card particularly selected from credit card, driver's license, passport, social security card, national ID cards, employee ID card, school ID card, key/control access cards, VIP cards, membership cards, IC/smart cards, key tags, luggage tags and bank/ATM cards including those with RFID.

Yet another objective of the present invention is to seal, coat, encapsulate, or cover the sensor with a material or layer to prevent it from being contaminated during making or using, and to protect it from undesirable effects such as humidity and light.

Another objective of the invention is to have a window to read the sensor. The window could be transparent or may have a removable or liftable layer.

Yet another objective of the invention is provide a devise and the ability to read the sensor with a reader such as a CCD camera, electron spin resonance (ESR), nuclear magnetic resonance (NMR), spectroscopy such as fluorescence, visual, ultra violet (UV), infra red (IR), and/or scanning and imaging without removing it from the IDPD.

Yet another objective of the invention is to have the IDPD devices contain personal identification information stored as a barcode, a magnetic strips, an electronic chip or the like.

Yet another objective of the present invention is to provide remotely readable dose and/or personal information, including RFID devices. The device optionally may have a small power source, such as a flat plastic battery, if so required.

Yet another objective of the present invention is to provide a disposable dosimeter which allows the user to estimate the dose instantly and then determine the dose accurately, if required, with conventional, accredited sensors and methods.

Yet another objective of the present invention is to provide a removable layer which is opaque to UV and sunlight on at least one sensor.

These and other advantages, as would be realized, are provided in a radiation detection device with at least one self indicating radiation sensor and at least one accredited sensor.

Yet another embodiment is provided in a process for determining exposure to radiation by an individual. The process includes providing a radiation detection device to the individual wherein the radiation detection device comprises at least one self indicating radiation sensor and/or at least one accredited sensor. A calibration method is provided wherein the individual can determine exposure to radiation above a threshold radiation by observing the self indicating radiation sensor. A method is provided for the individual to report an observation of radiation exposure above the threshold radiation. If there is an observation of radiation exposure the accurate radiation dosage is measured by reading the accredited sensor. The individual is then treated in accordance with the accurate radiation dosage measured.

Yet another embodiment is provided in a process of making a radiation detection device. In the process at least one self indicating radiation sensor and/or at least one accredited sensor and a matrix is provided. The self indicating radiation sensor and said accredited sensor are embedded in the matrix.

Yet another embodiment is provided in a process of determining exposure to radiation. The process includes providing a radiation detection device with at least one self indicating radiation sensor and/or at least one accredited sensor to at least one individual; visual inspection of the self indicating radiation sensor by the individual wherein a change of color indicates a potential exposure; reporting the potential exposure; machine reading the machine readable sensor to determine if an exposure to an actual dose above a threshold amount has occurred; and mitigating a source of the actual dose.

DESCRIPTION OF THE INVENTION

The present invention is directed to a radiation dosimeter in one of the most widely carried form, such as a license, identification card or access card with at least one self indicating radiation sensitive sensor and/or a second accredited sensor where both can be easily machine read at a very high speed for accuracy. The dosimeter would be particularly useful in the event of a radiological incident such as a dirty bomb, a nuclear bomb explosion, or an accident at a nuclear power plant. A sensor which can be read at a very high speed is embedded in a license, identification card, or access card which is normally carried by most people. The sensor may have at least one layer to protect it from being contaminated either during manufacture, use, and/or reading and also to protect it from ambient conditions to minimize false signals. Disclosed also is a reader and a process of monitoring radiation exposure of the device at a very high speed. The device has a human and machine readable sensor such as a color developing or color changing sensor to provide early visual warning. The human readable sensor may indicate the need for subsequent machine reading of the same or a second sensor. The device preferably has at least one indicator for a false signal and/or expiration of the shelf life. One of the main objectives of the invention is to determine dose distribution and to minimize the panic and worry of the people affected by a radiological incident such as a dirty bomb. It is also an objective to minimize potential unjustified lawsuits.

Most of us carry a wallet or a purse and in it we carry a license, ID card or access card. These devices reflect the individual's identity. In addition to the above ID devices, many of us also have a social security card, a passport, a national ID card, and a number of other similar items. The other similar items include key/control access cards, VIP cards, membership cards, IC/smart cards, key tags, luggage tags, bank/ATM cards, school ID cards, and employee ID cards, including those with RFID. If a radiation sensor, self reading, electronic, or others such as TLD, OSL, and RLG, is incorporated in the personal ID devices, it is possible to determine the dose of everyone in a given population at any time, especially in an event of a radiological incident. A personal ID device having a radiation sensor is referred herein as IDPD or IDPD device or IDPD dosimeter.

The preferred materials used in the self indicating radiation sensor of the device are a unique class of compounds called diacetylenes with a general formula $R'-C\equiv C-C\equiv C-R''$, where R' and R" are substituent groups which are described further herein. The self indicating radiation sensitive device is sensitive to all forms of radiation, with energy greater than that of UV light, which can penetrate the protective plastic films that cover the sensing strip of the self indicating radiation sensor. It responds to neutrons, X-ray typically with an energy higher than 10 KeV, and high energy electrons/beta particles. Color development of the sensing strip is essentially independent of dose rate. The self indicating radiation sensor of the device is approximately tissue equivalent and hence no dose correction is required. Particles, such as low energy electrons, protons, alphas, mesons, pions, and heavy ions will be absorbed by the protective films and will not typically reach the sensing strip.

When exposed to radiation such as a "dirty bomb", a nuclear detonation, or a radiation source, the self indicating radiation sensor of the device develops color, preferably blue or red, instantly. The color intensifies as the dose increases thereby providing the wearer and medical personnel instantaneous information on cumulative radiation exposure of the victim. The color intensity of the sensing strip increases with increasing dose. Dose can be estimated with an accuracy which is better than 20% with color reference chart and better than 10% using a calibration plot of optical density versus dose or CD camera.

As described in PCT applications WO2004017095 and PCT/US2004005860 both of which are incorporated herein by reference, a self indicating radiation sensor of the device has most of the desired properties to monitoring and estimating an accidental high dose of higher than about 0.1 rad instantly and/or for monitoring annual and lifetime dose. However, currently it does not have sufficient sensitivity and the methods of monitoring dose are not validated or accredited by any government agency. Commercially available radiation dosimeters and detectors such as TLD, OSL, RLG, X-ray film, and electronic have sufficient sensitivity and are validated or accredited by agencies such as National Voluntary Laboratory Accreditation Program (NAVLAP) and hence considered more reliable and can be presented in a court.

The invention will be described with particular emphasis on the preferred embodiments and will be described with reference to the figures forming an integral part of the specification. In the figures similar elements will be numbered accordingly.

Using a proper diacetylene and thickness of the coating, one can monitor dose lower than 1 rad. These SIRAD dosimeters are now made to monitor even lower dose, such as 0.01 rad, by using more sensitive diacetylenes, a thicker sensor, scanners, and a CCD camera for monitoring color.

Figure 1:
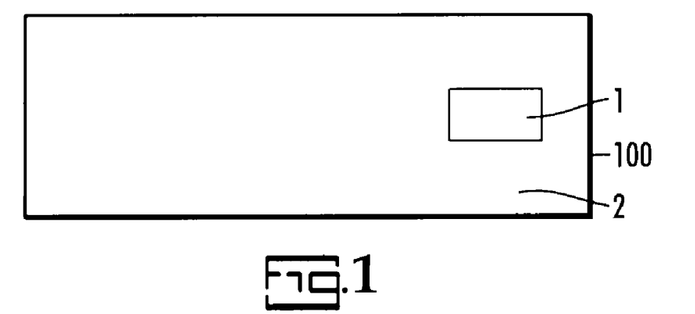
FIG. 1 is a schematic cross sectional representation of an IDPD of the present invention.

In FIG. 1, a sensor, 1, is sealed in a core layer, 2, of an IDPD, 100. The core layer, 2, could be transparent, colored or opaque and can have required printing on top and bottom surfaces. Sensor, 1, could be a self indicating radiation sensitive sensor or an accredited sensor such as TLD, OSL, RLG, or an X-ray film or the sensor could represent both the self indicating radiation sensitive sensor and the accredited sensor.

Figure 2:
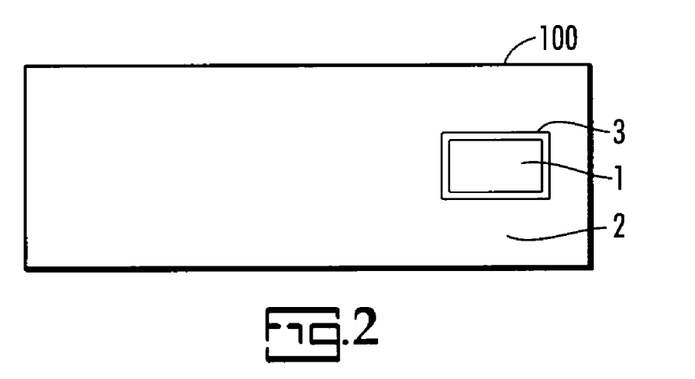
FIG. 2 is a schematic cross sectional representation of an IDPD with an encapsulated sensor.

A protective layer, such as Teflon® polytetrafluoroethylene or silicone coating, or an opaque pouch, 3, as shown in FIG. 2 can be provided to protect the sensor, 1, and prevent its contamination during manufacturing, using, and/or reading of IDPD and also to protect from ambient conditions to minimize false signals.

Figure 3:
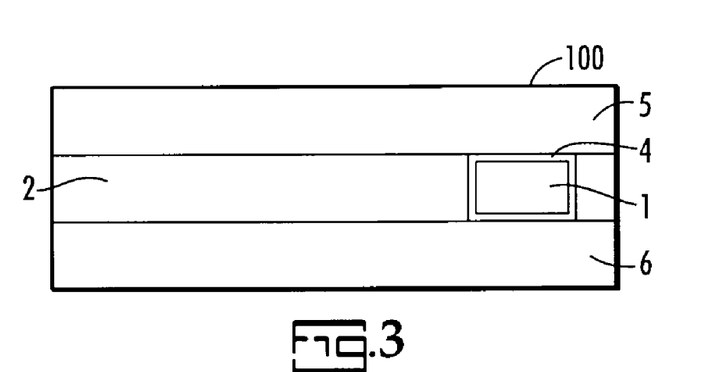
FIG. 3 is a schematic cross sectional representation of a three-layered IDPD with a sensor in a cavity.

With further reference to FIG. 3 the sensor, 1, could reside in a cavity, 4, of the core layer, 2, and it can be sealed between a top layer, 5, and bottom layer, 6. The top layer could be transparent the bottom layer could be opaque for the cavity, 4, in the core layer for the sensor, 1. The top layer or bottom layer include a color such as a red colored optical filter to mitigate the undesirable effect of ambient light without blocking other wavelengths.

In one embodiment the machine readable sensor could reside in the same cavity as the self indicating radiation sensitive sensor or in a separate cavity. Either sensor can be removed from the cavity for reading by die cutting or laser cutting.

Figure 4:
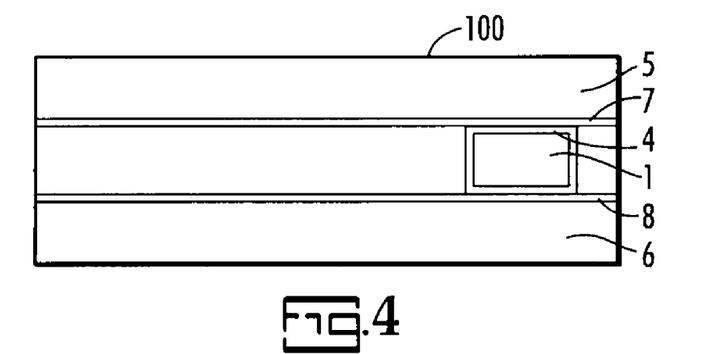
FIG. 4 is a schematic cross sectional representation of a three-layered IDPD with adhesive layers and a sensor in a cavity.

As shown in FIG. 4, the top, 5, and the bottom, 6, layers of IDPD, 1100, can either be fused together or can be sealed with adhesive layers, 7 and 8. The adhesive layers, 7 and 8, could be made from the same material. The adhesive layers can be made from a pressure sensitive adhesive but preferred is a hot melt adhesive. The top and bottom of the cavity may be non-stick or non-contaminating materials particularly selected from Teflon® polytetrafluoroethylene or silicone. Non-contaminating materials are materials which do not absorb liquid or water soluble materials.

Figure 5:
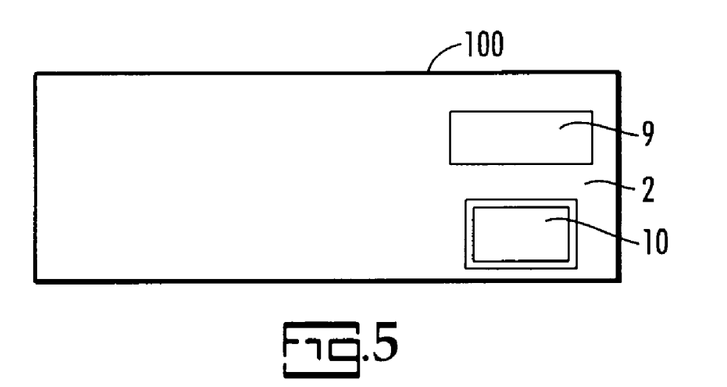
FIG. 5 is a schematic cross sectional representation of an IDPD with two sensors.
Figure 6:
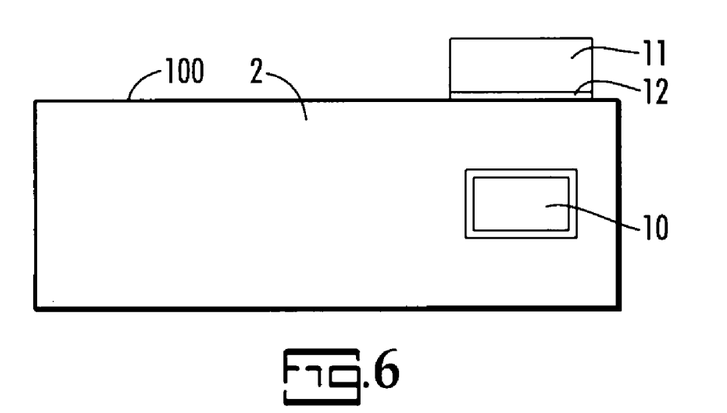
FIG. 6 is a schematic cross sectional representation of another IDPD with two sensors.

As shown in FIG. 5, the IDPD, 100, could have more than one sensor either of similar type or different types, such as a self indicating radiation sensitive sensor, 9, and an accredited sensor, 10. They could be located one over the other, next to each other, or one of them could be outside the IDPD as shown in FIG. 6.

Figure 7:
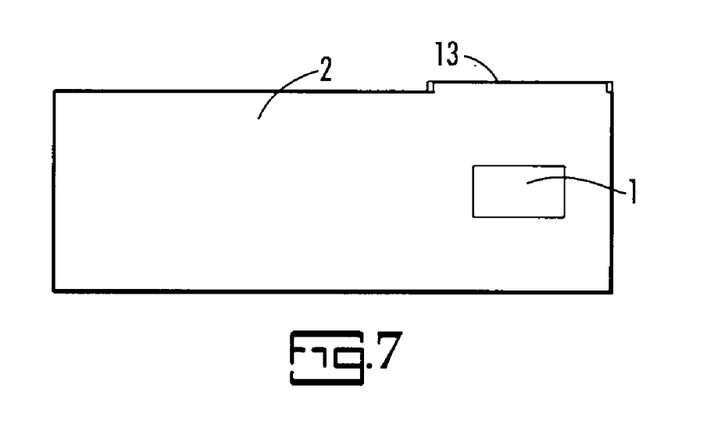
FIG. 7 is a schematic cross sectional representation of an IDPD with a window.
Figure 8:
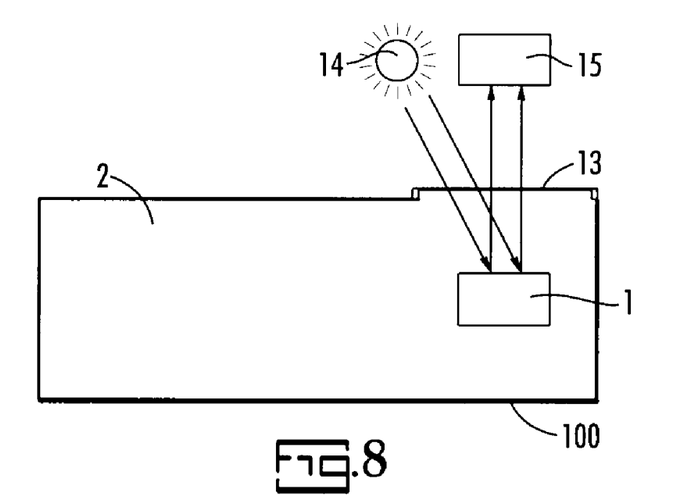
FIG. 8 is a schematic cross sectional representation of an IDPD with a light source and a detector for reading a dose.

It is desirable that the sensor be read without removing it from the IDPD. The self indicating radiation sensitive sensor, OSL, RLG, ESR, NMR, and similar sensors can be read without removal from the IDPD. Color development of a self indicating radiation sensitive sensor can be read with a light source, 14, and a detector such as a CCD camera, 15, similarly OSL and RLG sensors can be read by illuminating with one wavelength of UV or visible light preferably from a laser and monitoring emitted light with a CCD camera type detector similar to that shown in FIG. 8. This type of sensor may need a transparent top layer and a window, 13, as shown in FIGS. 7 and 8. The sensor may have a reflective layer behind the sensor for higher sensitivity. The IDPD can be read in a transmission mode as well. In such case IDPD would need two windows with a light source on one side a detector on the other side. Any combination of windows may be fixed, removable or liftable. A removable window is easily reversibly removed by scraping, rubbing and the like whereas a liftable window is reversible removable and typically has a portion permanently adhered to act as a hinge. The windows could also be made from a color optical filter to protect from ambient light and still maintain readability.

Figure 9:
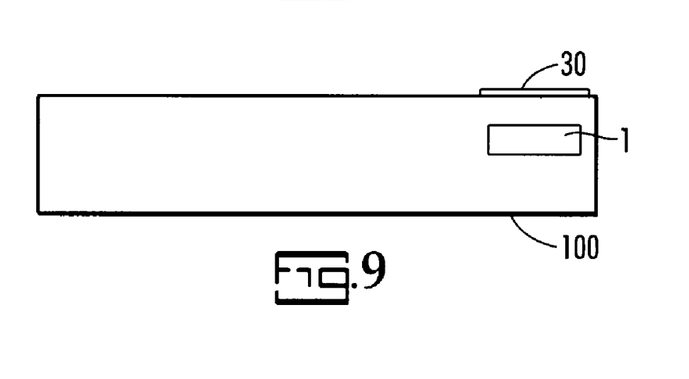
FIG. 9 is a schematic top, cross sectional and bottom representation of an IDPD in the form of a credit card.
Figure 10:
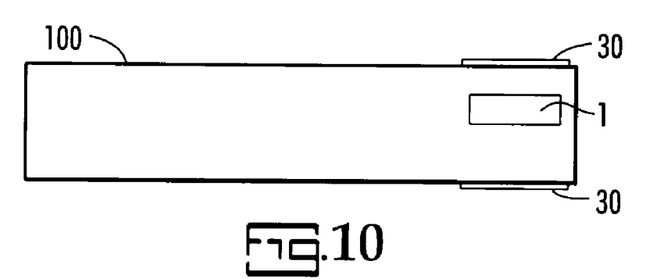
FIG. 10 is a schematic cross sectional representation of an IDPD with a sensor and a scratch-off bar.
Figure 11:
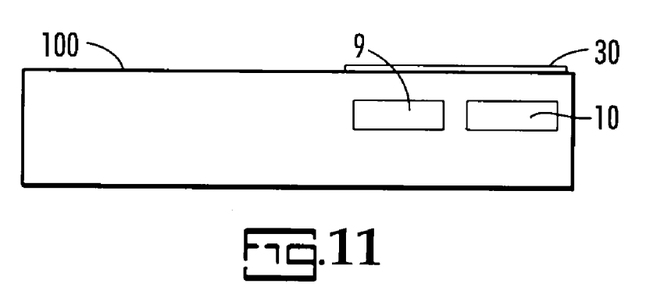
FIG. 11 is schematic cross sectional representation of another IDPD with a sensor and a scratch-off bar.
Figure 12:
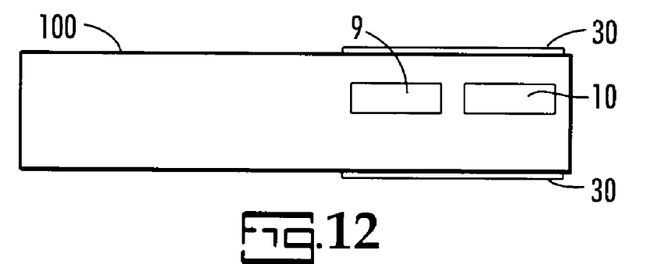
FIG. 12 is a schematic cross sectional representation of an IDPD with two sensors and a scratch-off bar.
Figure 13:
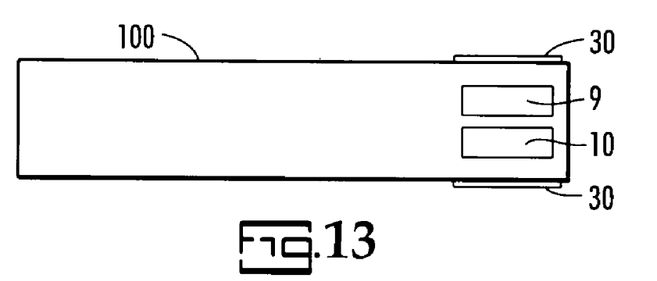
FIG. 13 is a schematic cross sectional representation of another IDPD with two sensors and a scratch-off bar.
Figure 14:
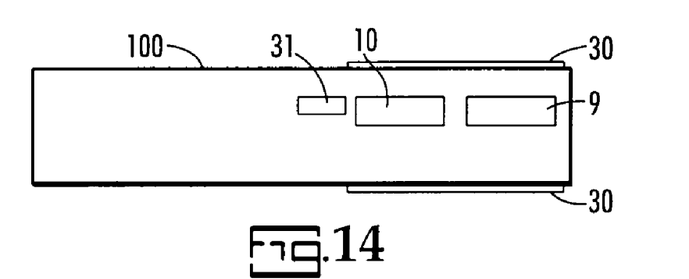
FIG. 14 is a schematic cross sectional representation of another IDPD with two sensors and a scratch-off bar.

As shown in FIG. 9, the IDPD, 100, may also have a sensor, 1, and a removable layer, 30, which is preferably opaque to visible and UV lights but transparent to ionizing radiation such as X-ray and beta ray. Transparent colored filter could also be used as window material. The removable layer, 30, could be on both sides as shown in FIG. 10. As shown in FIG. 11, The IDPD, 100, could have two sensors, for example one self indicating radiation sensitive sensor, 9, and the other an accredited sensor, 10, next to each other and a removable layer either on one side or on both sides of IDPD, 100, as shown in FIG. 12. As shown in FIG. 13, the sensors could be one over the other with a removable layer on each side of IDPD, 100. As shown in FIG. 14, an IDPD could have one or more indicators for false signals, 31, including those due to UV/sunlight exposure, pre-determined temperature, prolonged exposure to high temperatures, tampering, archiving and shelf life or an all-in-one type indicator, called a FIT indicator. FIT indicators are described in U.S. patent application Ser. No. 12/293,322 "Time-temperature, UV exposure, and Temperature indicator" which is incorporated herein by reference. Location of the sensors and false signal indicator could be anywhere inside, or outside, the IDPD. A FIT indicator is defined as a false positive, false negative, UV exposure, temperature, archiving and shelf life indicators individually or collectively. Instead of a FIT indicator a different indicator or combination of indicators may be used.

Once the removable layer is removed, such as by lifting, scratching off or by wiping off as described in patent application WO 2006124594 titled "A detector for a UV false positive of radiation sensitive devices", or transparent colored optical filter as disclosed in U.S. Provisional Patent Application No. 61/062,771 titled "Self Indicating Radiation Sensors And Dosimeters With Optical Absorbers And A Liftable Optical Filter" both of which are incorporated by reference, some of the sensors such as self indicating radiation sensitive sensor, OSL and RLG can be read, such as by illumination followed by reading with a detector such as CCD camera. The IDPD described herein could have a transparent colored optical filter layer attached or liftable.

The ESR and NMR type sensor would not need a window and can be read without any type of window. On the other hand TLD type sensors would need to be removed, such as by cutting them out and reading the light emitted at higher temperatures.

The IDPD shown above could have an indicator for a false positive, a negative, and/or a tamper indicator which can be applied on or under any layer.

In order to protect sensors from undesirable effects such as UV/sunlight, the sensor may have a UV absorbing layer, a transparent colored optical filter or an opaque layer on them.

Figure 15A:
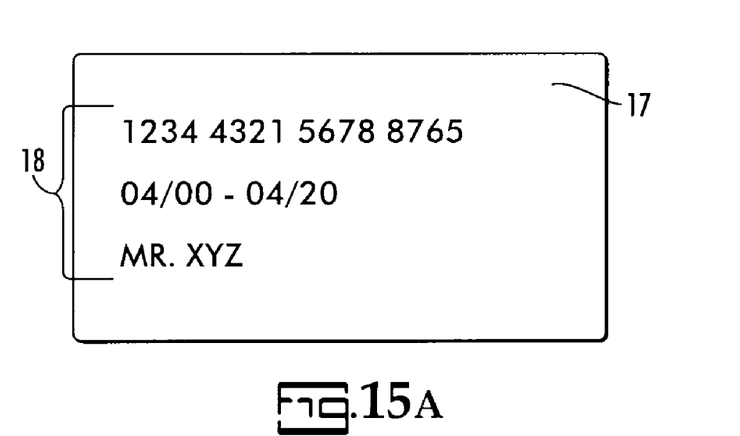
FIG. 15 is a schematic cross sectional representation of an IDPD with two sensors, scratch-off bars and a FIT indicator.
Figure 15B:
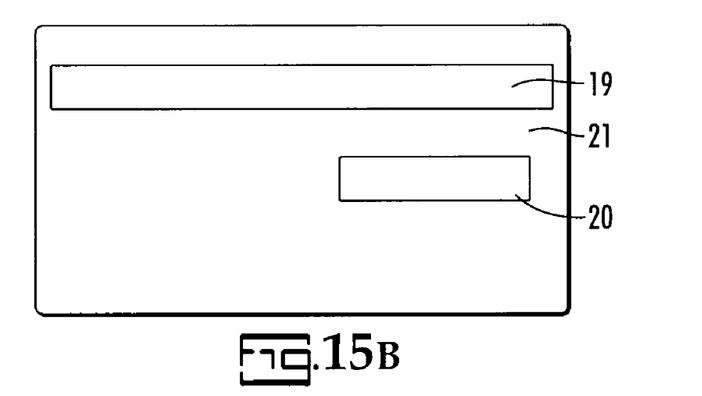

As shown in FIG. 15A, the top surfaces of the IDPD could have pictorial or textural information such as name of the user and number, 18, printed or engraved on either or both of the surfaces. As shown in FIG. 15B the bottom surface, 21, of the IDPD could also have a magnetic tape, 19, for storing information about the users and a location for other information, 20, such as a model number, serial number, expiration date, user printable area, instructions for use, etc. The core layer may have an electronic chip and RadioFrequency Identification Device (RFID) so the information can be read remotely. The sensor, 1, could be embedded anywhere inside the IDPD.

Figure 16:
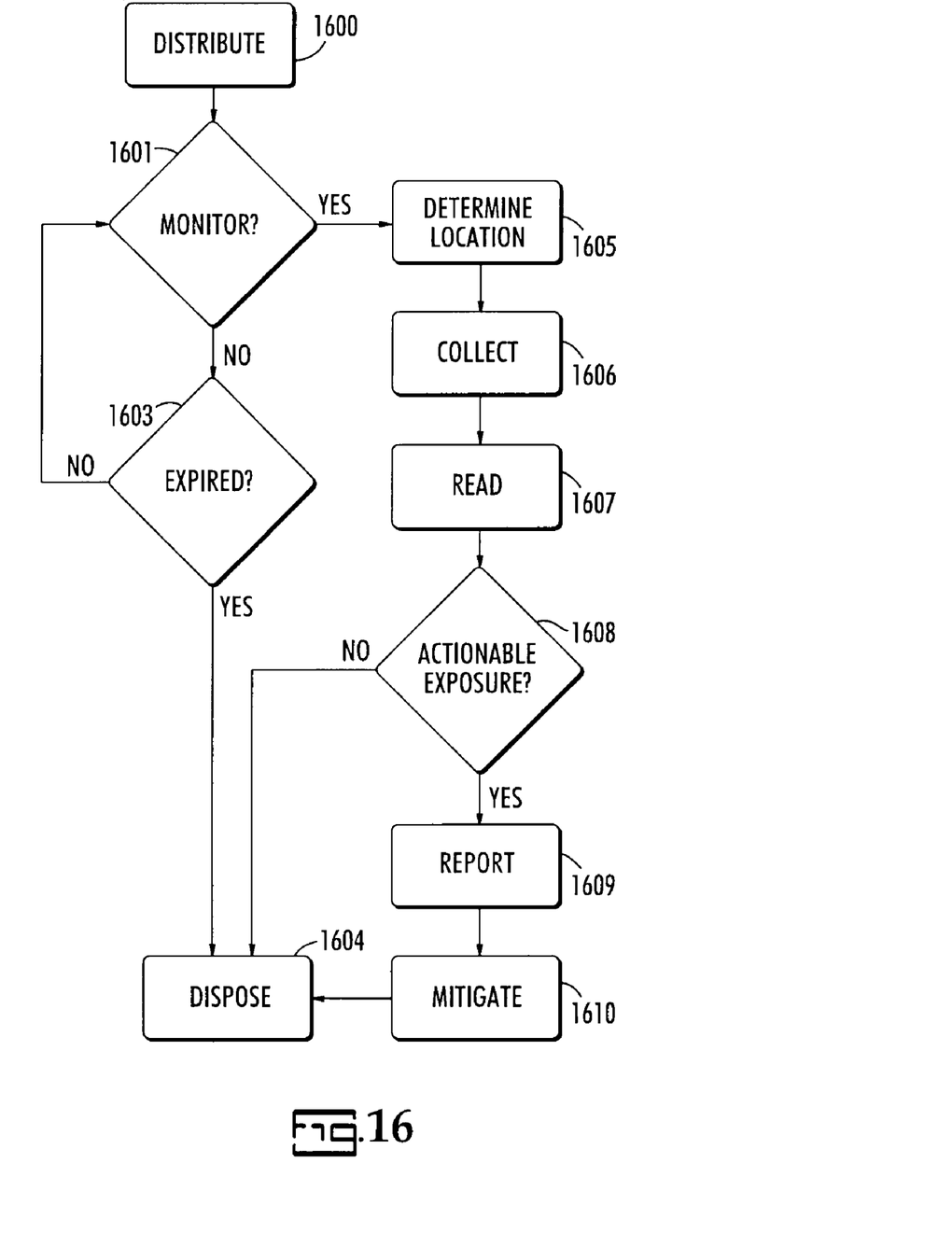
FIG. 16 is a block diagram describing the process of collecting cards, reading all information, reporting and providing medical treatment.

One of the main objectives of the IDPD is to determine dose distribution and to minimize the panic and worry of the people affected by a radiological incident such as a dirty bomb. Another main objective is to minimize potential unjustified lawsuits. FIG. 16 shows a flow diagram for distributing an IDPD to an area of decontamination.

In FIG. 16, the IDPD is distributed, 1600, to a subset of the population. The subset can be defined by location, occupation or classification. Location is suitable if population masses are to be protected. For example, if a certain city is suspected of being particularly vulnerable to a terrorist attack the entire population of the city, or a select subset, can be provided with an IDPD. Alternatively, the population may be further subdivided by location wherein representative members of the location are provided with an IDPD. For example, if a large city; such as New York, Washington D.C., Paris, London, Beijing or the like, is particularly vulnerable than that particular location may be subdivided into bureaus, towns, or districts and a percentage of the population in each subdivision may be provided with an IDPD. This eliminates the necessity for the entire population to have an IDPD but still provides a wide-spread network of detectors. The IDPD's may be distributed by occupation. For example, employees involved in nuclear energy production, emergency response, law enforcement, border enforcement, maritime monitoring, military operations, etc. may be provided IDPD's. IDPD's may also be distributed based on a classification. For example, the classification may involve particular licenses or access. Individuals with a drivers license, for example, may be provided with an IDPD as a component of the physical license or in addition to the physical license. Other classifications may include such elements as particular access cards to a physical or virtual location, a financial or computer based account, or any classification represented by presentation of a physical element is required for identification, access or entry.

Each individual member of the subset of the population monitors, 1601, the IDPD over a course of time. If no indication of a radiation event is evident the user, or a representative thereof, determines if the IDPD has expired, 1603. If the device has not expired the IDPD continues to be monitored. If the IDPD has expired the IDPD is disposed of, 1604, and replaced if appropriate.

Once a preliminary indication of a radiation event is indicated the process of dose determination proceeds. In a preferred embodiment the individual, or a representative, identifies the radiation location, 1605. The IDPD is preferably collected, 1606, in a manner consistent with good practices related to sample collection, isolation and retention to insure any result has the necessary level of integrity. The IDPD is read, 1607, by an instrument to accurately determine the actual dose. The reading of the IDPD preferably includes dose, or exposure, and any pertinent information such as individual, location, occupation or classification.

Based on the dose reading a determination is made regarding the existence of an actionable exposure, 1608. An actionable exposure is any exposure which is above a threshold to a sufficient amount to warrant a response. The determination of actionable exposure preferably includes a determination of a false reading. If the determination if that there is no actionable exposure the IDPD is disposed of, 1604. It would be readily understood that disposal may include a period of archiving to allow for the possibility of a subsequent test, and, for the purposes of the present invention disposal indicates removal of the IDPD from the cycle of radiation detection and it is therefore disposed for the purposes of use. Disposal also includes activities up to, and including, irreversible destruction.

If actionable exposure is determined to be present it is preferable to generate a report, 1609, and to mitigate the exposure, 1610. The report may be to the individual or for broader circulation such as to rescue personnel, military entities, maintenance personnel and the like for further mitigation activities. Mitigation is any activity which decreases the risk of further exposure to the tested individual or any other individual or facility. Mitigation may also include necessary medical treatment, decontamination of individuals or property and military action.

A system for reading dose for IDPD having a SIRAD type sensor can include a holder for the IDPD, an illuminator, a detector, data storage, a data processor and associated processes as described in a patent application titled "A General Purpose, High Accuracy Dosimeter Reader" WO2007089799 and references cited therein which are incorporated herein by reference. Similarly, commercially available systems with appropriate modifications can be used for reading OSL, TLD and RLG type sensors of IDPD.

An IDPD and data can also be archived if needed in the future.

Dose can be determined by comparing the read value with calibration data stored in the data storage such as a hard drive and a processor of a computer.

The detector of choice will depend on the type of sensor. For example, for SIRAD, OSL, TLD and RLG, a photodetector or a CCD camera can be used.

The illumination system will depend upon the sensor. For example for SIRAD, OSL, and RLG it could be a lamp or a laser The top, core, and bottom layers could be any material such a plastic, paper, or metal. The preferred material is a plastic. They could be made from natural and synthetic polymers, such as polyolefins, polyvinyls, polycarbonate, polyester, polyamide, or copolymer and block copolymers such as a copolymer of acrylonitrile, butadiene and styrene (ABS) and cellulose acetate. The most preferred materials for these layers are polyesters, polycarbonates, polyolefins, polyvinyls and copolymers such as ABS. These layers could be made from the same or different plastics. The most preferred materials are films of polyethylene terephthalate, polyvinylchloride, and polycarbonate.

The top transparent layer can be polyethylene terephthalate (PET), glycolated PET (PETG) or polyvinylchloride (PVC). The top surface is preferably treated physically or chemically for antiglare and scratch resistance.

The middle core layer could be a plastic film, such as PVC, PET or polyolefin, such as Teslin$^R$ or Artisyn$^R$, with die-cut cavities for sensors. The core layers should preferably be opaque. The core layer can be printed with any conventional method of printing.

The adhesive layers could be a pressure sensitive adhesive or a low melt adhesive. Other industrial and common adhesives, including two component adhesives such as those of polyepoxy and polyurethane can also be used for making adhesive layers. For heat activated adhesives, it is particularly preferred that the adhesive has a melting point of less than 100° C. In order to make the cards tamper resistant, the preferred bonding layer is a heat activated adhesive or two component bonding materials, such as polyepoxy or polyurethane, or those that can be cured by crosslinking. Heat activated adhesive is preferred because it makes the device tamper resistant and provides a stronger bond than that provided by a pressure sensitive adhesive.

A large number of machine readable radiation detectors, monitors, and dosimeters are used for detecting and monitoring radiation. The preferred machine readable radiation detectors include ionization chambers, proportional counters, Geiger-Mueller counters, scintillation detectors, semiconductor diode detectors (also referred herein as electronic sensor or electronic dosimeters), and dosimeters such as self-reading/SIRAD, TLD, OSL, RLG, and X-ray film. The most preferred machine readable sensors are self reading, TLD, OSL, RLG, X-ray film, and semiconductor diode. Provided herein are a sensor which is about 1 mm thick comprising a SIRAD with a highly sensitive diacetylene which has a lower limit detection as low as 0.01 rad. The detection limit is defined as a visible observable color change to the naked eye or with a machine. This highly sensitive SIRAD can be used instead of the conventional accredited sensors. In a IDPD there could be different types of accredited sensors such as TLD, RLG, and OSL in the same device. More preferably, the sensor is about 0.1 to 5 mm thick with about 0.9 to 1.1 mm thick being most preferred.

The size of the IDPD could vary from 1 square mm to any large size e.g., credit card or 1 meter by 1 meter with more than one sensors. More preferably, the IDPD is a rectangle with sides ranging from about 20 mm to about 100 mm. A rectangle with a long side of about 70 to about 100 mm and a short side of about 40 to about 60 mm is particularly preferred. The IDPD may also comprise a void for easy attachment to a key ring or the like.

An IDPD having the sensors described herein can be in the form of a credit card, key/control access cards, business cards, VIP cards, promotion cards, membership cards, IC/smart cards, key tags, luggage tags, bank cards, ATM cards, school ID, employee ID and the like. A sticker type IDPD can be applied on commonly carried items such as a wallet, a purse, and clothing.

The materials, designs, and processes which can be used for making dosimeters are described in our previously filed U.S. Pat. Nos. 5,420,000 titled "Heat fixable high energy radiation imaging film"; 5,672,465 titled "Polyethyleneimine binder complex films" and 7,227,158—"A Stick-On Self-Indicating Instant Radiation Dosimeter" and applications WO 2007097785 titled "Method Of Making Smart Cards With An Encapsulant" WO 2007089799 titled "A General Purpose, High Accuracy Dosimeter Reader" WO 2006124594 titled "A Detector For A UV False Positive Of Radiation Sensitive Devices" US 2006145091 titled "Self Indicating Radiation Alert Dosimeter"; US 2005208290 titled "Thick Radiation Sensitive Devices"; Ser. No. 12/293, 322 titled "Time-Temperature, UV Exposure, And Temperature Indicator" or U.S. Provisional Patent Application No. 61/062,771 titled "Self Indicating Radiation Sensors And Dosimeters With Optical Absorbers And A Liftable Optical Filter" each of which is incorporated herein by reference.

The sensor could have filters to selectively filter off unintentional radiation such as transparent colored optical filter or copper, cadmium, etc. Filters are routinely used for TLD, RLG and OSL type dosimeters. An IDPD could have more than one sensor of the same type for detection of different energies or types of radiation such photons, beta/electrons, neutrons, etc.

An IDPD can be manufactured in large quantities using the commercially available equipment and procedures for making credit cards, smart cards, high security ID cards, and bank/ATM cards with electronic chips and RFID type elements. Tamper resistant and evident cards also can be made by these processes.

The present invention provides advantages which are not otherwise available in the art. Due to the simplicity and size it is highly suitable as a highly reliable dosimeter for mass distribution. It is ideally suited as a personal dosimeter assigned to an individual. In a particularly preferred embodiment the dosimeter can be coordinated with an additional functionality. For example, many industrial environments utilize some type of entry system wherein a credit card sized device must be monitored to allow entry into a protected area. By incorporating the present invention into such devices it essentially ensures that the user has the sensor on their persons thereby increasing the likelihood of early detection in the case of an industrial radiation event. In a particularly preferred embodiment, an RFID device can be embedded thereby rapidly coordinating a detectable device with a location and/or individual to facilitate rapid deployment of appropriate emergency response personnel.

In the case of purposeful exposure, such as in the case with terrorist activities, the device is particularly useful. Since most people already carry cards such as credit cards, drivers licenses etc. and are already in the mindset of having these in close proximity to their person the present invention takes advantage of normal human behavior and is available for monitoring radiation virtually continuously without extra effort. In an event of a terrorist activity it would allow emergency personnel to rapidly determine the epicenter of an event and rapidly alert the citizens. Citizens could then immediately determine if they have been exposed and those within the cone of exposure could be treated rapidly, the cone evacuated, and the threat mitigated. A mitigated threat is one that has been eliminated or contained.

In a particularly preferred embodiment the device comprises indicia indicating the individual to which the device is assigned. This reduces the likelihood of a sensor being a shared device and increases the likelihood that a positive reading is correlated to an individual.

The present invention provides significant social advantages. Realizing that any exposure can be noticed, and mitigated, quickly greatly reduces the worry and panic associated with an attempted attack, whether real or imagined, and decreases the ability of a would be terrorist to bluff the presence of a radiation device. Due to the awareness of the possibility of a terrorist attack even a bluff, wherein a radiation device is stated to be present when in fact it is not, causes great concern and in many ways has the financial and emotional impact of an actual attack. By providing citizens with an early warning this type of "emotional warfare" can be thwarted. In the case of an actual attack the number of individuals actually involved is immediately obvious which decreases the panic and greatly facilitates mitigation of the problem. Furthermore, since the detectors are easily read by an individual the present device greatly minimizes the stress placed on a health care system when faced with a population wherein some unknown fraction of the population may be exposed to enough radiation requiring medical treatment. Currently, there is no mechanism for efficient triage.

A particular business advantage of the present invention is the ability to multiply the effective number of inspectors. Typically, trained inspectors would be responsible for determining if there is a radiation event in an industrial environment. If a detector is provided for a large number of individuals each one becomes a potential inspector since any exposure would be readily realized even if it is not otherwise detectable by the human senses.

The method of manufacturing the IDPD includes those methods generally relied on for manufacturing laminated products with elements embossed therein. In one method, layers are preformed and then combined in a process of lamination wherein the preformed layers are pressed together with an adhesive there between as either an additional layer or as a layer which is integral to at least one formed layer. In another method the IDPD is formed by injection molding as widely practiced in the art.

In the general formula, R'—C≡C—C≡C—R", where R' and R" are the same or different substituent groups. Though this class of diacetylenes is preferred, other diacetylenes having the following general formulas can also be used: higher acetylenes: R'—(C≡C)$_n$—R", where n=3-5; split di and higher acetylenes: R'—(C≡C)$_m$—Z—(C≡C)$_o$—R", where Z is any diradical, such as —(CH$_2$)$_n$— and —C$_6$H$_4$—, and m and o is 2 or higher; and polymeric di and higher acetylenes: [-A-(C≡C)$_n$—B—]$_x$, where A and B can be the same or different diradical, such as —(CH$_2$)$_b$—, —OCONH—(CH$_2$)$_b$—NHCOO—, and —OCO(CH$_2$)$_b$OCO— where R' and R" can be the same or different groups.

The preferred diacetylenes include those where R' and R" are selected from: (CH$_2$)$_b$—H; (CH$_2$)$_b$OH; (CH$_2$)$_b$—OCONH—R1; (CH$_2$)$_b$—O—CO—R1; (CH$_2$)$_b$—O—R1; (CH$_2$)$_b$—COOH; (CH$_2$)$_b$—COOM; (CH$_2$)$_b$—NH$_2$; (CH$_2$)$_b$—CONHR1; (CH$_2$)$_b$—CO—O—R1; where b=1-10, preferably 1-4, and R1 is an aliphatic or aromatic radical, e.g. C$_4$-C$_6$ alkyl or phenyl or substituted phenyl, and M is a cation, such as Na$^+$ or (R1)$_3$N$^+$.

The preferred diacetylenes are the derivatives of 2,4-hexadiyne, 2,4-hexadiyn-1,6-diol, 3,5-octadiyn-1,8-diol, 4,6-decadiyn-1,10-diol, 5,7-dodecadiyn-1,12-diol and diacetylenic fatty acids, such as tricosa-10,12-diynoic acid (TC), pentacosa-10,12-diynoic acid (PC), their esters, organic and inorganic salts and cocrystallized mixtures thereof. The most preferred derivatives of the diacetylenes, e.g. 2,4-hexadiyn-1,6-diol, are the urethane and ester derivatives.

Preferred urethane derivatives are alkyl, aryl, benzyl, methoxy phenyl, alkyl acetoacetate, fluoro phenyl, alkyl phenyl, halo-phenyl, cyclohexyl, toyl and ethoxy phenyl of 2,4-hexadiyn-1,6-diol, 3,5-octadiyn-1,8-diol, 4,6-decadiyn-1,10-diol, 5,7-dodecadiyn-1,12-diol. The prefer urethane derivatives are methyl, ethyl, propyl and butyl derivatives of 2,4-hexadiyn-1,6-diol, 3,5-octadiyn-1,8-diol, 4,6-decadiyn-1,10-diol, 5,7-dodecadiyn-1,12-diol.

The following are some of the preferred derivatives of 2,4-hexadiyn-1,6-diol: urethane (—OCONH—) derivatives, R'CH$_2$—C≡C—C≡C—CH$_2$R', including: hexyl urethane: 166, R'=OCONH(CH$_2$)$_5$CH$_3$; pentyl urethane: 155, R'=OCONH(CH$_2$)$_4$CH$_3$; butyl urethane: 122, R'=OCONHCH$_2$CH$_3$; ethyl urethane: 111, R'=OCONHCH$_3$; ester (—OCO—) derivatives, R'''CH$_2$—C≡C—C≡C—CH$_2$R''', including: butyl ester: 144E, R'''=OCO(CH$_2$)$_3$CH$_3$; ethyl ester: 122E, R'''=OCOCH$_2$CH$_3$; methyl ester: 111E, R'''=OCOCH$_3$; symmetrical diacetylenes including: 156: R'—C≡C—C≡C—R", where R'=CH$_2$OCONH(CH$_2$)$_5$CH$_3$ and R"=CH$_2$OCONH(CH$_2$)$_4$—CH$_3$; cocrystallized mixtures including: containing 80 weight percent or above of 166; 85:15 mixture of 166 and 156; 90:10 mixture of 166 and 156 and 4:1 mixture of tricosadiynoic acid and pentacosadiynoic acid (TP41).

The further preferred diacetylenes are derivatives of 3,5-octadiyn-1,8-urethane, 4,6-decadiyn-1,10-urethane and 5,7-dodecadiyn-1,12-urethane, e.g., hexyl urethane: R'=OCONH(CH$_2$)$_5$CH$_3$; pentyl urethane: R'=OCONH(CH$_2$)$_4$CH$_3$; butyl urethane: R'=OCONH(CH$_2$)$_3$CH$_3$; propyl urethane: R'=OCONH(CH$_2$)$_2$CH$_3$; ethyl urethane: R'=OCONHCH$_2$CH$_3$; methyl urethane: R'=OCONHCH$_3$.

The most preferred diacetylenes are the urethane derivatives such methyl, ethyl, propyl and butyl urethane derivatives of 4,6-decadiyn-1,10-diol, e.g., diacetylene 344 [R'—C≡C—C≡C—R' where R'=OCONH(CH$_2$)$_3$CH$_3$.

The urethane derivatives can be prepared by reacting diacetylene-diol, e.g., 2,4-hexadiyn-1,6-diol with an appropriate isocyanates (e.g. n-hexylisocyanate) in a solvent, such as tetrahydrofuran, using catalysts, such as di-t-butyltin bis (2-ethylhexanoate) and triethylamine as indicated below:

Catalysts

Ester derivatives can be prepared by reacting e.g., 2,4-hexadiyn-1,6-diol with appropriate acid chlorides in a solvent, such as dichloromethane, using a base, such as pyridine as the catalyst; i.e., Pyridine Asymmetrical diacetylenes can be prepared by the Cadiot-Chodkiewicz type reaction methods.

Though individual diacetylenes can be used, it is desirable to alter the reactivity of diacetylenes by cocrystallization. Cocrystallization can be achieved by dissolving two or more diacetylenes, preferably conjugated, prior to molding. For example, when TC and PC are co-crystallized, the resulting cocrystallized diacetylene mixture, such as TP41 (4:1 mixture of TC:PC) has a lower melting point and significantly higher radiation reactivity. The reactivity can also be varied by partial neutralization of diacetylenes having —COOH and —NH$_2$ functionalities by adding a base, such as an amine, NaOH, Ca(OH)$_2$, Mg(OH)$_2$ or an acid, such as a carboxylic acid, respectively.

Other preferred diacetylenes are amides of fatty chain acid, such as TC and PC. The preferred amides are: TCAP=CH$_3$(CH$_2$)$_9$—C≡C—C≡C—(CH$_2$)$_8$—CONH—(CH$_2$)$_3$CH$_3$; PCAE=CH$_3$(CH$_2$)$_{11}$—C≡C—C≡C—(CH$_2$)$_8$—CONH—CH$_2$CH$_3$; PCAP=CH$_3$(CH$_2$)$_{11}$—C≡C—C≡C—(CH$_2$)$_8$—CONH—(CH$_2$)$_3$CH$_3$; PCACH=CH$_3$(CH$_2$)$_{11}$—C≡C—C≡C—(CH$_2$)$_8$—CONH—C$_6$H$_5$; and TCACH=CH$_3$(CH$_2$)$_9$—C≡C—C≡C—(CH$_2$)$_8$—CONH—C$_6$H$_5$.

In order to maximize radiation reactivity, 166 can be co-crystallized with other diacetylenes, e.g. 155, 157, 154 and 156, which are described above. Though certain diacetylenes, such as 155, increase the reactivity of 166, the partially polymerized cocrystallized diacetylenes provide a red color upon melting. However, 156 increases the radiation reactivity of 166 and provides a blue color upon melting the partially polymerized diacetylene mixture. 166 can be cocrystallized with different amounts of 156. Preferred is where the amount is 5-40 weight percent of 156 to 166, most preferred are 90:10 and 85:15 respective weight ratios of 166:156. As used herein "9010" and "8515" refer to these specific cocrystallized mixtures.

Other asymmetrical derivatives, including different functionalities, e.g., ester as one substituent and urethane as the other, can also be prepared. A procedure for synthesis of a 90:10 mixture of 166 and 16PA is given in U.S. Pat. No. 5,420,000. Using the general procedures given in U.S. Pat. No. 5,420,000, it is possible to prepare a variety of other asymmetrical derivatives and their mixtures for cocrystallization.

Polymers having diacetylene functionality [e.g., $\{-R'-(C{\equiv}C)_n-R''-\}_x$, where R' and R'' can be the same or different diradical, such as $-(CH_2)_n-$, $-OCONH-(CH_2)_n-NHCOO-$ and $-OCO(CH_2)_nOCO-$ in their backbones are also preferred because of the fact that they are polymeric and do not require a binder.

The preferred diacetylenes are those which have a low (e.g., below about 150° C.) melting point and crystallize rapidly when cooled at a lower temperature, e.g. room temperature.

Another class of preferred diacetylenic compounds is those having an incorporated metal atom and they can be used as built-in converters. Diacetylenes having functionalities, such as amines, ethers, urethanes and the like can form complexes with inorganic compounds. It is possible to synthesize diacetylenes having an internal converter, which is covalently bonded, such as boron and mercury, lithium, copper, cadmium, and other metal ions. For example, the —COOH functionality of TC, PC and TP41 can be neutralized with lithium ion and synthesis of $R-C{\equiv}C-C{\equiv}C-Hg-C{\equiv}C-C{\equiv}C-R$ is reported (M. Steinbach and G. Wegner, Makromol. Chem., 178, 1671 (1977)). The metal atom, such as mercury atom thereby incorporated into the diacetylene can emit short wavelength irradiation upon irradiation with photons and electrons.

The following terminologies are used for defining the reactivity (polymerizability) of a diacetylene. The polymerizable form of a diacetylene(s) is referred to as "active". If a diacetylene is polymerizable with radiation having energy higher than 4 eV, wavelength shorter than 300 nm, then it is referred to as "radiation active". If it is polymerizable upon thermal annealing then it is referred to as "thermally active". A form of diacetylene, which displays little or no polymerization, is referred to as "inactive". If it displays little polymerization with radiation (having energy higher than 4 eV) then it is referred to as "radiation inactive" and if it is significantly nonpolymerizable upon thermal annealing, then it is referred to as "thermally inactive". Diacetylenes having reactivity/polymerizability characteristics in between these definitions are referred to as "moderately active". The most preferred form of diacetylene is one, which is highly radiation reactive and displays little or no thermal reactivity. However, diacetylenes, which are radiation active also usually, have some thermal reactivity. Hence, the preferred form of diacetylene is one, which is highly to moderately radiation active with little or no thermal reactivity. Thermal reactivity can be decreased and radiation reactivity can be increased by cocrystallization and molecular complexation. As an alternative, the shaped-articles can be stored at a lower temperature to slow down the thermal reactivity.

The invention has been described with particular reference to the preferred embodiments without limit thereto. One of skill in the art would readily appreciate additional modifications and embodiments which are not specifically stated but which are within the scope of the invention as set forth in the claims appended hereto.

The invention claimed is:

1. A process of determining the extent and amount of exposure to radiation for a portion of a population, comprising the sequential steps of:
   1) providing a radiation detection device to individuals of said portion of said population, wherein the radiation detection device contains at least one self indicating radiation sensor and at least one accredited sensor wherein said radiation detection device is rectangular with each side having a length of at least 1 mm to no more than 100 mm and a thickness of 0.1 to 5 mm;
   2) inspecting the self indicating radiation sensor of said radiation detection devices by visual inspection to determine if exposure has occurred, wherein a change of color in the self indicating radiation sensor indicates an exposure;
   3) categorizing said portion of population into exposed individuals and unexposed individuals wherein each said exposed individual is indicated by a change of color in said self indicating radiation sensor;
   4) reading said accredited sensor in said radiation detection device of only said exposed individuals with a machine reader to determine if an actual dose above a threshold amount of said exposure has occurred; and
   5) determining a number of individuals receiving above said threshold amount.

2. The process of determining the extent and amount of exposure to radiation for a portion of a population of claim 1 wherein said radiation detection device is contained in an element selected from a license, an identification card, and an access card.

3. The process of determining the extent and amount of exposure to radiation for a portion of a population of claim 1 where a core layer of the radiation detector is sandwiched between a protective layer and an opaque layer, wherein the protective layer is transparent or a colored transparent optical filter.

4. The process of determining the extent and amount of exposure to radiation for a portion of a population of claim 3 where said core layer has at least one cavity therein.

5. The process of determining the extent and amount of exposure to radiation for a portion of a population of claim 4 where said radiation detection device is in said cavity.

6. The process of determining the extent and amount of exposure to radiation for a portion of a population of claim 1 where said radiation detection device is protected from ambient conditions.

7. The process of determining the extent and amount of exposure to radiation for a portion of a population of claim 1 further comprising a window through which said radiation detection device is read.

8. The process of determining the extent and amount of exposure to radiation for a portion of a population of claim 7 wherein said window is a removable layer or a liftable layer.

9. The process of determining the extent and amount of exposure to radiation for a portion of a population of claim 1 further comprising an indicator for monitoring false signals.

10. The process of determining the extent and amount of exposure to radiation for a portion of a population of claim 1 further comprising at least one indicator selected from the group consisting of an indicator for monitoring tampering, an indicator for monitoring false negative, an indicator for monitoring archiving of the exposure, an indicator for monitoring shelf life and an indicator for monitoring temperature.

11. The process of determining the extent and amount of exposure to radiation for a portion of a population of claim 1 wherein said radiation detection device has a sensitivity of 0.01 rad.

12. The process of determining the extent and amount of exposure to radiation for a portion of a population of claim 1 wherein said radiation detection device comprises a diacetylene.

13. A process of determining exposure to radiation comprising the sequential steps of:
  1) providing a radiation detection device comprising at least one self indicating radiation sensor and at least one accredited sensor to at least one individual;
  2) inspecting visually said self indicating radiation sensor by said individual wherein a change of color of said self indicating radiation sensor indicates a potential exposure;
  3) reporting said potential exposure; and
  4) reading with a machine reader said accredited sensor to determine if an exposure to an actual dose above a threshold amount has occurred for said individual only if said potential exposure is indicated.

14. The process of determining exposure to radiation of claim 13 which comprises mitigating a source of said actual dose.

15. The process of determining exposure to radiation of claim 13 wherein said color change is correlated to said actual dose.

16. The process for determining exposure to radiation of claim 13 further comprising providing a calibration method wherein said individual can determine exposure to radiation above a threshold radiation by observing said self indicating radiation sensor.

17. The process for determining exposure to radiation of claim 16 further comprising providing a method for said individual to report an observation of radiation exposure above said threshold radiation.

18. The process for determining exposure to radiation of claim 13 further comprising treating said individual in accordance with said accredited radiation dosage measured.

19. The process for determining exposure to radiation of claim 13 wherein said accredited sensor is removed from said radiation detection device prior to said measuring.

20. The process for determining exposure to radiation of claim 19 wherein said accredited sensor is removed by a method selected from die cutting and laser cutting.

21. The process for determining exposure to radiation of claim 19 further comprising a layer over at least one of said self indicating radiation sensor and said accredited sensor.

22. The process for determining exposure to radiation of claim 21 wherein said layer is selected from a transparent layer, transparent colored layer and an opaque layer.

23. The process for determining exposure to radiation of claim 21 further comprising removing a portion covered by said layer prior to said measuring.

24. The process for determining exposure to radiation of claim 23 wherein said removing said layer is a liftable layer or a removable layer.

25. The process for determining exposure to radiation of claim 13 wherein said accredited sensor is not removed from said device prior to said measuring.

26. The process for determining exposure to radiation of claim 13 wherein said accredited sensor is read by a method selected from the group consisting of optical imaging, conductivity, ESR, NMR and radio frequency.

27. The process for determining exposure to radiation of claim 13 further comprising identifying a location of said exposure.

28. The process for determining exposure to radiation of claim 13 further comprising mitigating said exposure.

29. The process for determining exposure to radiation of claim 13 comprising providing multiple radiation detection devices to multiple individuals wherein each radiation detection device of said radiation detection devices is assigned to an individual of said individuals.

30. The process for determining exposure to radiation of claim 29 wherein each said individual has at least one of a common location, a common occupation or a common classification.

31. A process of determining the extent and amount of exposure to radiation for a portion of a population, comprising the steps of:
  providing radiation detection devices to individuals of said portion of said population, wherein each radiation detection device of said radiation detection devices is provided for one individual of said individuals and each said radiation detection device contains at least one self indicating radiation sensor; at least one accredited sensor and at least one FIT indicator wherein said radiation detection device is a rectangular with each side between 1 mm and 100 mm and a thickness of 0.1 to 5 mm;
  inspecting the self indicating radiation sensor of each said radiation detection device by visual inspection to determine if exposure has occurred, wherein a change of color in the sensor indicates a potential exposure to said individual;
  inspecting the FIT indicator of said radiation detection device to determine if said potential exposure is false; and
  reading an accredited sensor in said radiation device of only said exposed individuals with a machine reader to determine if an exposure to an actual dose above a threshold amount has occurred without said false potential exposure.

* * * * *